Nov. 20, 1956  V. L. FRAZIER  2,771,303
TANDEM AXLE SPRING SUSPENSION UNIT
Filed Sept. 8, 1953  2 Sheets-Sheet 2

Van L. Frazier
INVENTOR.

BY *Clarence A. O'Brien*
*and Harvey B. Jacobson*
Attorneys

United States Patent Office 2,771,303
Patented Nov. 20, 1956

2,771,303

TANDEM AXLE SPRING SUSPENSION UNIT

Van L. Frazier, Springfield, Mo., assignor to Frazier Tandem Systems, Springfield, Mo., a corporation of Missouri Application September 8, 1953, Serial No. 378,820

4 Claims. (Cl. 280—104.5)

This invention relates generally to spring suspensions for vehicles, and pertains more particularly to improvements in tandem axle suspension.

A primary object of this invention resides in the provision of means for varying the spring rate in a tandem axle system in accordance with movement of the axle unit, resulting from both surface conditions of the roadway and in accordance with the load applied to the vehicle.

Another object of this invention is to provide an improved suspension system for vehicles which incorporates axle members stabilized with track bars and utilized in conjunction with freely floating spring means, a portion of the spring means resting upon a movable abutment member including mechanism for varying the rate of springing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
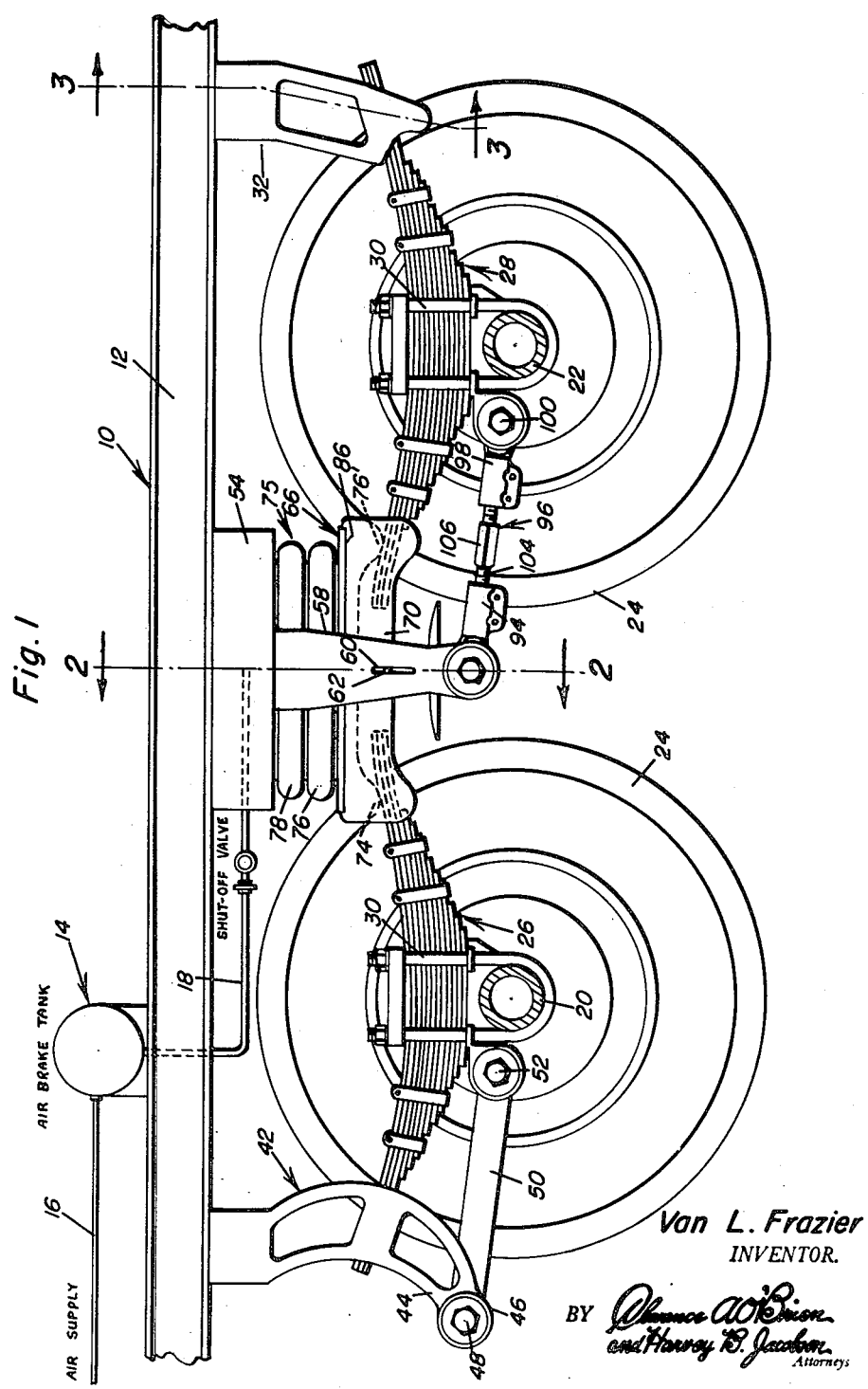
Figure 1 is a side elevational view taken just inside the near wheel, showing adjacent portions of a vehicle incorporating the improved suspension system.
Figure 3:
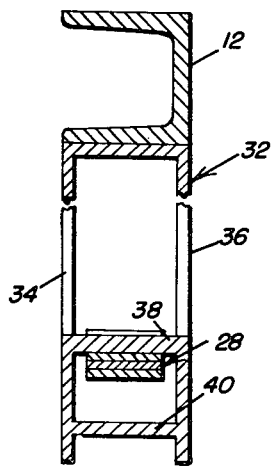
Figure 3 is a vertical section taken substantially along the plane of section line 3—3 in Figure 1, showing details of one of the fixed abutment members.

Referring now more particularly to Figure 1, reference numeral 10 indicates generally the frame of a vehicle which is constructed and formed in a conventional manner and which includes the side rail members 12, one only being shown, and the frame provides a support for the air brake reservoir tank, indicated generally by the reference character 14, having an associated supply line 16 and an outlet line 18. A pair of tandem axle members 20 and 22 are provided for supporting the rearward portion of the vehicle frame, and these axles support the wheel members 24 in any conventional manner, and are secured to the leaf spring members 26 and 28 by means of conventional U-bolt assemblies 30. The springs 26 and 28 are of semi-elliptical construction and are arranged longitudinally of the frame, and the rearward end of the rear spring 28 support the frame through the medium of the abutment member, indicated generally by the reference character 32, which depends from the undersurface of the frame rail 12. The abutment member includes the spaced side members 34 and 36 which are interconnected by the web plates 38 and 40 at their lower end providing an opening through which the free end of the spring 28 projects with the undersurface of the member 38 in engagement with the spring, in the manner shown most clearly in Figure 3.

An abutment member 42 is provided in engagement with the forward end of the front spring 26, in the manner shown, and the lower end 44 of this abutment member terminates in a boss portion 46 through which a pivot bolt 48 extends for pivotally securing the track bar 50 to this abutment member, the track bar extending rearwardly therefrom and pivotally secured by means of a bolt 52 to the front axle 20, thus maintaining this axle in proper position relative to the frame.

Figure 2:
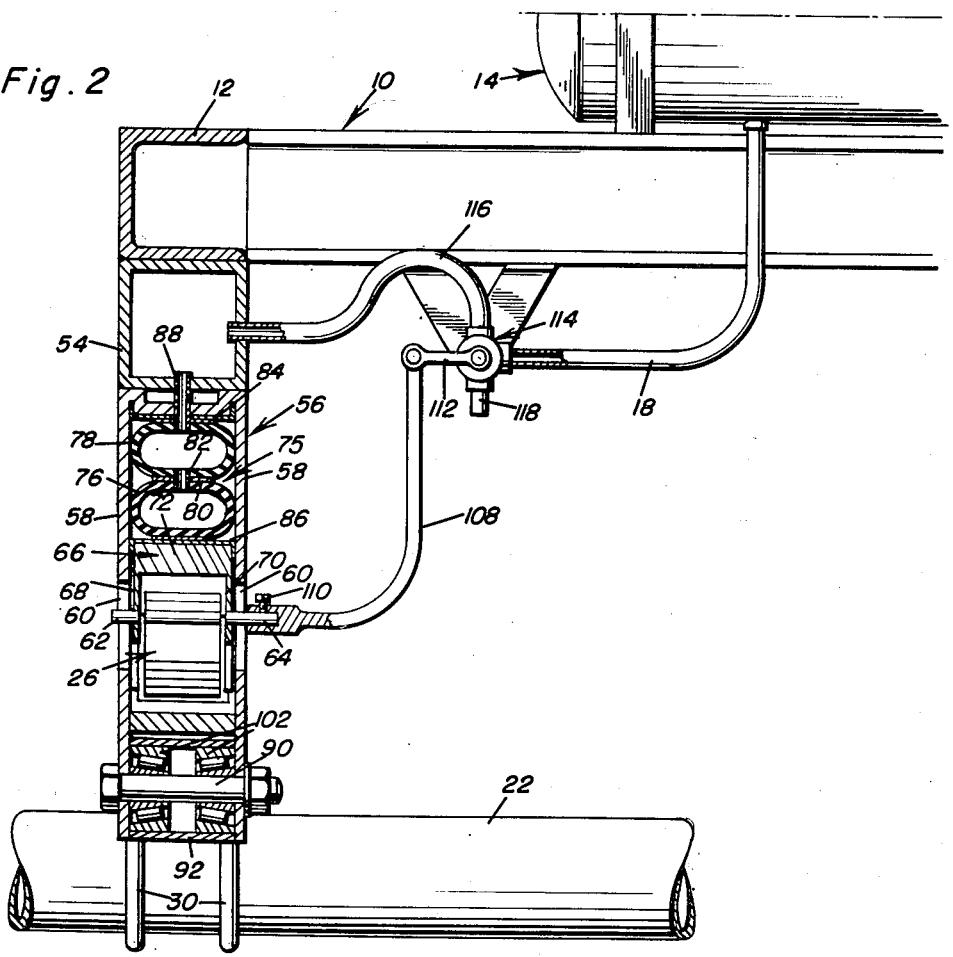
Figure 2 is a vertical section taken substantially along the plane of section line 2—2 in Figure 1, showing details of the movable abutment member.

Referring now more particularly to Figure 2, it will be seen that a surge or reservoir tank 54 is rigidly secured to the undersurface of each of the frame members 12 and that a guide bracket indicated generally by the reference character 56 is, in turn, secured to the bottom face of this tank, the bracket including the spaced depending leg portions 58, each of which is provided with an elongated longitudinal groove 60 in its intermediate portion through which the pin members 62 and 64 floatingly project in the manner shown. An abutment member 66 of generally U-shape in cross-section includes the side flanges 68 and 70 to which the pin members 62 and 64, respectively, are secured, and the opposite ends of the web 72 of this abutment member are provided with the depending shoulders 74 and 76' which rest upon the free ends of the front and rear springs, respectively, in the manner shown most clearly in Figure 1. Interposed between the bracket 56 and the abutment member 66 is the bellows assembly indicated generally by the reference character 75 which comprises a pair of elongated sack members 76 and 78 bonded together as at 80, and provided with interconnecting nipples 82 so that the interiors of the sacks are in communication. The metallic plates 84 and 86 are bonded to the upper and lower surfaces of the bellows assembly 75 providing bearing plates for engagement against the bracket 56 and abutment member 66, respectively. A pipe 88 communicating with the upper sack 78 projects within the interior of the surge tank 54 to establish communication therewith.

The lower ends of the side plates 58 are apertured to receive the pivot bolt 90, these plates being maintained in proper position by the spacing sleeves 92 disposed therebetween which forms the forward end of the coupler member 94 of the track bar assembly indicated generally by the reference character 96. An identical coupler member 98 is similarly secured to a pivot bolt 100 carried by the rear axle unit 22, in each case, suitable bearing means 102 being interposed between the pivot bolts and the associated coupler sleeves, in the manner shown. The two couplers 94 and 98 are interconnected by the bolt member 104 having its opposite ends threaded in opposite directions and having its intermediate portion 106 of polygonal cross-section for turning the bolt and varying the effective length of the track bar 96 in a manner well known in the art. Of course, suitable means are provided for clamping the couplers 94 and 98 to the bolt 104.

Referring once again to Figure 2, it will be seen that the inner pin 64 is connected to the laterally bent end of a control arm 108 as by the set screw member 110, and the upper end of this control arm is pivotally secured to a valve lever 112 associated with the valve 114 connecting the line 18 selectivley to the surge tank inlet line 116 and the exhaust line 118. This valve may be termed a three-position valve inasmuch as the upper position of the lever 112 establishes communication between the reservoir tank 14 and the surge tank 54, through the lines 18 and 116, while the intermediate position shown in Figure 2 shuts off all flow through the line 18 and the lower position of the lever 112 vents the tank 54 through the line 116 and the outlet 118. The purpose of this construction will be presently apparent.

It will be manifest that regardless of the load on the vehicle, the bellows assembly 75 and associated valve mechanism 114 operating through the control arm 108 in response to the position of the movable abutment member 66 will tend to stabilize or equalize the position of this movable abutment member into the position shown in Figure 2, that is, a neutral position, inasmuch as upward movement of the abutment member and therefore the control arm 108 will establish communication between the tanks 14 and 54 inflating the bellows assembly 75 to force the abutment member 66 downwardly until it has assumed the neutral position. Likewise, movement of the abutment member 66 in a downward direction will vent the tank 54 and hence, the bellows members 75, so that the latter may collapse to allow the abutment member 66 to assume its neutral position. Thus, the heavier the load on the vehicle, the stiffer the spring rates afforded by the bellows assembly 75 inasmuch as the bellows will be under greater internal pressure. Should the vehicle pass over a bump or obstruction such as to move the axle units 20 or 22 towards the frame and hence shift the abutment member 66 upwardly, the spring rate effected through the bellows assembly 75 will become progressively greater as the axle units are moved upwardly, due to the bleeding of air into the surge tank 54. It will be noted that the surge tank not only effects a support for the bracket 56, but also acts as an accumulator for relieving the bellows assembly 75 from undue strain due to rapid vertical oscillation of the axle units while the same pass over washboard surfaces. The net over-all effect of the above described assembly is to afford much more desirable springing characteristics to the tandem axle unit.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a vehicle, a frame, tandem axles supporting said frame in part, a semi-elliptical spring secured to each of said axles, each of said springs having one end bearing directly upon the vehicle frame, a variable rate springing assembly forming bearing means between the opposite ends of said springs and said frame, said spring assembly including a bracket secured to said frame, said bracket having a pair of spaced, depending legs, an abutment member slidably disposed between said legs and upon which said opposite ends of the springs directly bear, an inflatable bag disposed between the upper ends of said bracket and said abutment member, said bracket legs being provided with vertically elongated, aligned slots, pins carried by said abutment member and projecting through said slots for guiding said abutment member in a vertical path between said bracket legs, and means for varying the volume of working fluid within said inflatable bag, said means including a control valve and an actuating arm connected between said valve and one of said pins.

2. In a vehicle, a frame, tandem axles supporting said frame in part, a semi-elliptical spring secured to each of said axles, each of said springs having one end bearing directly upon the vehicle frame, a variable rate springing assembly forming bearing means between the opposite ends of said springs and said frame, said springing assembly including a reservoir tank secured to the undersurface of said frame, a bracket secured to said tank, said bracket having a pair of spaced, depending legs, an abutment member slidably disposed between said legs and upon which said opposite ends of the springs directly bear, an inflatable bag disposed between the upper ends of said bracket and said abutment member, a conduit communicating said tank and said inflatable bag, said bracket legs being provided with vertically elongated, aligned slots, pins carried by said abutment member and projecting through said slots for guiding said abutment member in a vertical path between said bracket legs, and means for varying the volume of working fluid within said inflatable bag, said means including a control valve and an actuating arm connected between said valve and one of said pins.

3. In a vehicle, a frame, tandem axles supporting said frame in part, a semi-elliptical spring secured to each of said axles, each of said springs having one end bearing directly upon the vehicle frame, a variable rate springing assembly forming bearing means between the opposite ends of said springs and said frame, said variable rate springing assembly including an abutment member upon which said opposite ends of the springs directly bear and an inflatable bag disposed between said frame and said abutment member, means connected to said abutment member responsive to relative movement between said abutment member and said frame for varying the pressure within said inflatable bag, said pressure varying means including a control valve, a conduit adapted to connect to a source of fluid under pressure and in which said control valve is arranged, an actuating arm operatively connected to said control valve, mechanical means securing said control valve to said abutment member so that upon movement of said abutment member with respect to said frame, said control valve is actuated to permit fluid to pass through said conduit, and means including a chamber for establishing communication with said conduit and said inflatable bag downstream of said valve.

4. The combination of claim 3 wherein said abutment member has leg portions to which said mechanical means are connected, a bracket connected to said frame on which said inflatable bag reacts, and guide means for said abutment member operatively associated with and constituting a part of said bracket.

References Cited in the file of this patent

UNITED STATES PATENTS

| 1,823,401 | Johnson | Sept. 15, 1931 |
| 2,000,914 | Blair | May 14, 1935 |
| 2,110,214 | Flowers | Mar. 8, 1938 |
| 2,361,575 | Thompson | Oct. 13, 1941 |
| 2,663,569 | Gouirand | Dec. 22, 1953 |